United States Patent
Eyb

(10) Patent No.: US 10,220,546 B2
(45) Date of Patent: Mar. 5, 2019

(54) MANUFACTURING METHOD AND MANUFACTURING MOLD

(71) Applicant: SENVION SE, Hamburg (DE)

(72) Inventor: Enno Eyb, Kiel (DE)

(73) Assignee: Senvion SE, Hamburg (DE)

( * ) Notice: Subject to any disclaimer, the term of this patent is extended or adjusted under 35 U.S.C. 154(b) by 414 days.

(21) Appl. No.: 14/633,078

(22) Filed: Feb. 26, 2015

(65) Prior Publication Data

US 2015/0202799 A1  Jul. 23, 2015

Related U.S. Application Data

(63) Continuation of application No. PCT/EP2013/002423, filed on Aug. 13, 2013.

(30) Foreign Application Priority Data

Aug. 27, 2012 (DE) .................. 10 2012 215 189

(51) Int. Cl.
*B29C 33/00* (2006.01)
*B29C 70/44* (2006.01)
(Continued)

(52) U.S. Cl.
CPC ...... *B29C 33/0061* (2013.01); *B29C 33/0066* (2013.01); *B29C 33/0077* (2013.01);
(Continued)

(58) Field of Classification Search
CPC . B29C 33/0061; B29C 70/48; B29C 33/0077; B29C 70/548; B29C 70/443;
(Continued)

(56) References Cited

U.S. PATENT DOCUMENTS 4,942,013 A * 7/1990 Palmer ............... B29C 43/3642
156/285
5,403,537 A   4/1995 Seal et al.
(Continued)

FOREIGN PATENT DOCUMENTS

DE   19850462 A1   5/2000
DE   19922850 C1   8/2000

OTHER PUBLICATIONS

International Search Report dated Nov. 18, 2013 in corresponding International Patent Application No. PCT/EP2013/002423.

*Primary Examiner* — Michael N Orlando
*Assistant Examiner* — Christian Roldan
(74) *Attorney, Agent, or Firm* — Rankin, Hill & Clark LLP

(57) ABSTRACT

A method for manufacturing a composite fiber component for a rotor blade of a wind turbine that includes introducing a fiber material into a mold, supplying a flowable matrix material via a longitudinally extending runner of the mold using a vacuum infusion method such that the fiber material is soaked with matrix material from the runner and the matrix material flows transversely to the longitudinal extension of the runner such that a first region of the fiber material is substantially soaked with matrix material from a first section of the runner and a second region of the fiber material is substantially soaked with matrix material from a second region of the runner, and matrix material flow rates are set for the first section and the second section of the runner depending on thicknesses of the fiber material in the first region and the second region of the runner, respectively.

11 Claims, 2 Drawing Sheets

(51) Int. Cl.
  *B29C 70/54*  (2006.01)
  *B29C 70/48*  (2006.01)
  *B29K 105/08*  (2006.01)
  *B29L 31/08*  (2006.01)

(52) U.S. Cl.
  CPC ............ *B29C 70/443* (2013.01); *B29C 70/48* (2013.01); *B29C 70/548* (2013.01); *B29K 2105/08* (2013.01); *B29L 2031/085* (2013.01); *Y02P 70/523* (2015.11)

(58) Field of Classification Search
  CPC ............... B29C 33/0066; Y02P 70/523; B29K 2105/08; B29L 2031/085
  USPC ....................................................... 264/257
  See application file for complete search history.

(56) References Cited

U.S. PATENT DOCUMENTS

| | | | |
|---|---|---|---|
| 6,406,660 B1 | 6/2002 | Spurgeon | |
| 2008/0044506 A1 | 2/2008 | Zahlen et al. | |
| 2010/0201045 A1* | 8/2010 | Schibsbye | B29C 70/443 264/511 |
| 2010/0209651 A1* | 8/2010 | Mikkelsen | B29C 70/443 428/56 |
| 2012/0119422 A1* | 5/2012 | Lockett | B29C 70/443 264/554 |
| 2013/0056914 A1* | 3/2013 | Frankowski | B29C 70/44 264/571 |

\* cited by examiner

MANUFACTURING METHOD AND MANUFACTURING MOLD

CROSS-REFERENCE TO RELATED APPLICATIONS

This application is a continuation of International App. Ser. No. PCT/EP2013/002423, filed Aug. 13, 2013, and claims priority to DE 102012215189.3, filed Aug. 27, 2012.

BACKGROUND OF INVENTION

1. Field of Invention

The invention relates to a method for manufacturing a fiber composite component, in particular a fiber composite component for a rotor blade of a wind turbine. The invention additionally relates to a manufacturing mold for manufacturing a fiber composite component, in particular a fiber composite component for a rotor blade of a wind turbine. The invention further relates to the use of a manufacturing mold for manufacturing a fiber composite component having a longitudinal extension.

2. Brief Description of Related Art

Rotor blades of modern wind turbines generally comprise a plurality of components connected together which are manufactured individually in fiber composite construction techniques. The individual components are typically planar having lengths of up to a few tens of meters, widths of up to several meters and in comparison to that, small thicknesses. Here, the components are typically not flat, but rather for reasons of stability and/or aerodynamics, have complex two-dimensional shapes. Often, the thickness varies over the surface of the component, for the same reasons.

So-called vacuum infusion has proven itself with the manufacture of such components. Here, the fiber preform, such as fiber mats, fiber fabrics, etc. is placed in an open mold device, which provides the three-dimensional shape of the component to be manufactured. The mold device having the fiber preform is then sealed for example using vacuum film, and placed under vacuum, or respectively low-pressure. Liquid resin, supplied using hoses or runners, flows into the mold under the effect of the low-pressure, and saturates the fiber preform. After the resin hardens, the corresponding component is then provided.

Problems here are faulty saturation, such as accumulations of resin or air inclusions, because they severely impair the durability and resilience of the finished component. Faulty saturations can arise for example in that regions of different thicknesses of the fiber preform are saturated with resin at different speeds.

BRIEF SUMMARY OF THE INVENTION

Based on this prior art, the object of the present invention is to improve durability and resilience of a component of a fiber composite technique for a rotor blade of a wind turbine having various thicknesses, and in particular to correspondingly improve the manufacturing of such a component using vacuum infusion.

This object is solved by a method for manufacturing a fiber composite component, in particular a fiber composite component for a rotor blade of a wind turbine, comprising the following method steps:

introducing a fiber material for the fiber composite component into a manufacturing mold,
  supplying a flowable matrix material for the fiber composite component via a longitudinally extending runner of the manufacturing mold, using a vacuum infusion method, such that the fiber material in the manufacturing mold is soaked with matrix material from the runner flowing transversely to the longitudinal extension of the runner, wherein a first region of the fiber material is substantially soaked with the matrix material from a first section of the runner, and a second region of the fiber material is substantially soaked with matrix material from a second section of the runner, and
  setting a first matrix material flow rate for the first section of the runner depending on a thickness of the fiber material in the first region, and setting a second matrix material flow rate for a second section of the runner depending on the thickness of the fiber material in the second region.

Using the invention, two regions of the fiber material, which each have different thicknesses, are supplied or provided the matrix material with, in each case, a different matrix material flow rate. As a result of this, a uniform soaking of the fiber material is attained even with different thicknesses. In particular, more than two regions and more than two matrix material flow rates can be provided, wherein the matrix material flow rates can be adapted in particular to the thickness of the fiber material.

In the scope of the invention matrix materials are understood to be, in particular flowable natural or synthetic resins that harden under the effects of air, heat and/or light, including the effects of UV light. Fiber material identifies, in particular glass fiber preform, carbon fiber preform or plastic fiber preform in the form of fiber mats, webs, fleece or continuous fibers. The fiber material is introduced or laid out, in particular in layers into the manufacturing mold, wherein fill material such as balsa wood can be provided between the layers of fiber material.

According to the invention the fiber material is soaked with flowable matrix material which bonds with the fibers of the fiber material into a permanent fiber composite material, wherein in the fiber composite material the fibers of the fiber material are embedded in a matrix of hardened matrix material.

Preferably all layers which can be soaked with matrix material are considered for setting a matrix material flow rate. The matrix material flow rate is or will be set depending on a thickness of the fiber material, for example the overall thickness of the fiber material, or the overall thickness of the fiber material and the fill material in a region. The thickness of the fiber material and/or the fill material averaged over a region is also a suitable thickness of the fiber material, depending upon which the matrix material flow rate is or can be set.

In this context, matrix material flow rate is understood in particular to be a quantity of matrix material which is supplied or provided per unit time and per unit length over the corresponding section of the runner for soaking the fiber material.

A more uniform spreading of the matrix material is advantageously attained in the entire fiber material, when, in particular with a small thickness of the fiber material, a small matrix material flow rate is set, and with a large thickness of the fiber material a large matrix material flow rate is set. Hereby, in particular a dependency of the flow speed of the matrix material in the fiber material is advantageously influenced by the thickness of the fiber material.

With a preferred design of the method according to the invention it is provided that the first matrix material flow rate is or will be set through a first cross-sectional area at or in the first section of the runner, and/or that the second matrix"

material flow rate is or will be set through a second cross-sectional area at or in the second section of the runner.

In the scope of the invention, a cross-sectional area is understood in particular to be the shape and/or size of a matrix material volume flow in or at a section of the runner in a plane transverse to a spreading direction of the matrix material volume flow. For example, cross-sectional areas in the sense of the invention are the cross-section of the runner at a given point along its longitudinal extension, or the clearance through area of an inlet for matrix material from a matrix material store to a section of the runner.

The object underlying the invention is also solved by a manufacturing mold for manufacturing a fiber composite component, in particular a fiber composite component for a rotor blade of a wind turbine, comprising a runner having a longitudinal extension for supplying flowable matrix material for the fiber composite component, wherein fiber material for the fiber composite component can be soaked in the manufacturing mold with matrix material from the runner flowing transverse to the longitudinal extension of the runner, wherein the runner has at least a first section having a first cross-sectional area, preferably for creating a first matrix material flow rate depending on a thickness of the fiber material in a first region, and at least a second section having a second cross-sectional area, preferably for creating a second matrix material flow rate depending on a thickness of the fiber material in the second region.

The first cross-sectional area is preferably matched to the thickness of the fiber material in the first region, and the second cross-sectional area is preferably matched to the thickness of the fiber material in the second region. A matrix material flow rate matched to the thickness of the fiber material is hereby attained in the different regions in a simple manner.

The manufacturing mold according to the invention is suited in particular for the use with an aforementioned method according to the invention for manufacturing a fiber composite component.

The invention also comprises embodiments with which the runner has more than two sections each with a corresponding cross-sectional area, wherein the number of sections and the design of cross-sectional areas thereof can be set, and in particular can be matched to the number of fiber layers having different thicknesses.

Depending on the design of the fiber composite component to be manufactured it can be advantageous in the individual case if the runner has a substantially continuously varying cross-sectional area at least in sections along its longitudinal extension. This would correspond to a runner having any arbitrary number of short sections and is advantageous in particular if a continuously or substantially continuously varying matrix material flow rate can be set along the longitudinal extension.

A particularly preferred embodiment of the manufacturing mold according to the invention is characterized in that the runner is designed having a variable cross-sectional area at least in sections.

A variable cross-sectional area in this context is in particular a cross-sectional area which is designed reversible and non-destructively variable.

This results in the advantage that the cross-sectional area of the runner, or respectively the cross-sectional area of at least a section of the runner, and thus the matrix material flow rate set through the cross-sectional area can be optimized quickly and easily, or can be matched to changed requirements. In particular, the manufacturing mold itself, which generally is very elaborate and costly to manufacture, can be used further.

Preferably the manufacturing mold comprises a mold body having a channel, wherein the channel at least in sections is designed as a runner by means of an inlay having a complementary shape to the channel. According to the invention, an inlay is specified for a channel of a mold body which has formed an outlet channel, and is formed on a side opposite to the outlet channel with a shape complementary to the channel, wherein the outlet channel has a first section having a first cross-sectional area and a second section having a second cross-sectional area.

The runner can hereby be adapted and optimized quickly, easily and cost-effectively, in particular, by exchanging the inlay. Such inlays also permit a retrofitting of the manufacturing mold according to the invention with existing manufacturing molds having a channel.

The object underlying the invention is further solved by the use of a manufacturing mold according to the invention for manufacturing a fiber composite component having a longitudinal extension, wherein the manufactured fiber composite component has along its longitudinal extension at least a first region having a first thickness and a second region having a second thickness.

Advantageously, a manufacturing mold is used for this in which the longitudinal extension of the runner is arranged substantially parallel to the longitudinal extension of the fiber composite component to be manufactured in the manufacturing mold.

Particularly preferred is the use of a manufacturing mold in which the first section of the runner is arranged near the first region of the fiber composite component to be manufactured in the manufacturing mold, and the second section of the runner is arranged near the second region of the fiber composite component to be manufactured in the manufacturing mold.

The first cross-sectional area preferably has a different size than the second cross-sectional area.

Further characteristics of the invention will become apparent from the description of the embodiments according to the invention together with the claims and the included drawings. Embodiments according to the invention can fulfill individual characteristics or a combination of several characteristics.

BRIEF DESCRIPTION OF THE DRAWINGS

The invention is described below, without restricting the general idea of the invention, using exemplary embodiments with reference to the drawings, whereby we expressly refer to the drawings with regard to the disclosure of all details according to the invention that are not explained in greater detail in the text. The figures show in.

In the drawings, the same or similar types of elements and/or parts are provided with the same reference numbers so that a corresponding re-introduction can be omitted.

DETAILED DESCRIPTION OF THE INVENTION

Figure 1:
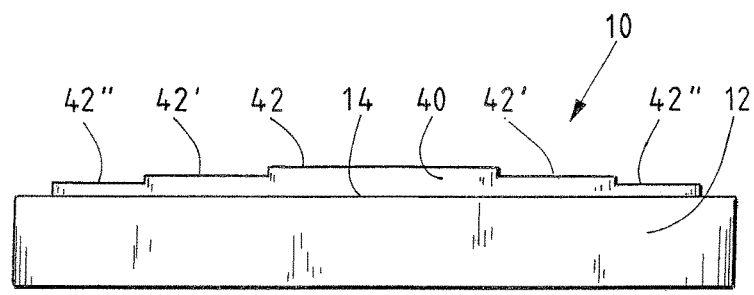
FIG. 1 a schematic side representation of a manufacturing mold according to the invention with fiber material for a fiber composite component.

FIG. 1 schematically shows a side view of the manufacturing mold 10 according to the invention for a fiber composite component. The mold is an open manufacturing mold 10 having a mold body 12. The mold body 12 on its top side has a mold surface 14 that specifies the shape and surface properties of a side of the fiber composite component to be manufactured.

Fiber material 40, for the fiber composite component to be manufactured is inserted or applied in the manufacturing mold 10, or respectively on the mold surface 14. The fiber material is laid out having different thicknesses corresponding to the desired properties of the fiber composite component to be manufactured. In the schematically represented example, a center region 42 has the largest thickness, to which are connected on each of both sides a region 42' of average thickness, and to each region 42' of average thickness, a region 42" of the smallest thickness. The different thicknesses of different regions 42, 42', 42" are given for example by a different number of layers on the fiber preform and/or fill material.

Figure 2:
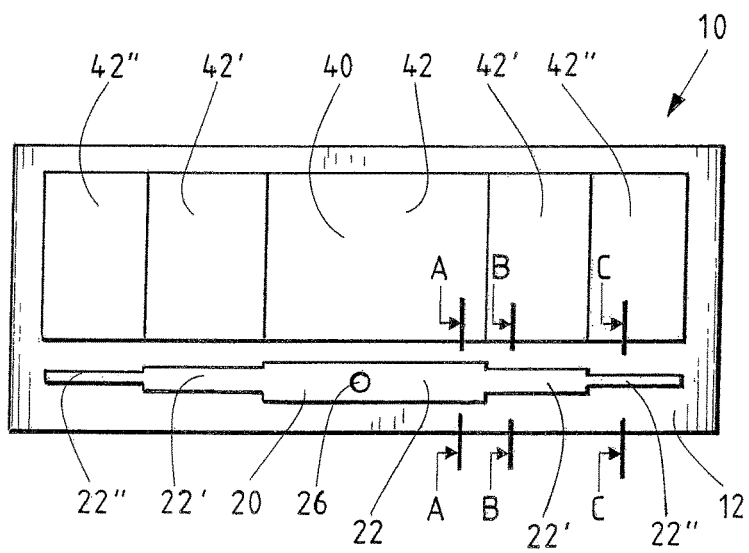
FIG. 2 a schematic top view of the manufacturing mold according to the invention from FIG. 1.

FIG. 2 shows a top view of the open manufacturing mold 10 from FIG. 1 having the inserted or applied fiber material 40.

The fiber material 40 has a two-dimensional contour with a longitudinal extension and a transverse extension corresponding to the fiber composite component to be manufactured. In the example shown, the longitudinal extension of the longer side and the transverse extension of the shorter side correspond to the rectangular contour of the fiber material 40 shown schematically in FIG. 2.

The fiber material 40, along the longitudinal extension, has the previously represented regions 42, 42', 42" of different thicknesses, whereas transverse to this, i.e. in the direction of the transverse extension, the thickness of the fiber material 40 remains substantially constant.

The fiber material 40 in the manufacturing mold 10, or respectively on the mold surface 14, is soaked with flowable resin for manufacturing the fiber composite component. For this, the manufacturing mold 10 has a runner 20 having a supply connection 26 for resin from a resin store, not shown. The runner 20 has a longitudinal extension which is aligned substantially parallel to the longitudinal extension of the fiber composite component to be manufactured, or respectively to the longitudinal extension of the fiber material 40 in the manufacturing mold 10.

A vacuum infusion method is used for example for soaking the fiber material 40 with the resin. Here, the fiber material 40 in the manufacturing mold 10 is covered with a vacuum film, not shown, which is or will be sealed with respect to the mold body 12 of the manufacturing mold 10. The air is then pumped out of the thusly arising airtight, sealed cavity between vacuum film and manufacturing mold 10, or respectively mold body 12. Due to the thusly arising low-pressure, or vacuum, resin from the resin store arrives via the supply 26 into the runner 20, is distributed along the longitudinal extension of the runner 20, and flows out of the runner 20 into the fiber material 40. Here, a resin flow front forms in the fiber material 40 which progresses substantially transverse to the longitudinal extension of the runner 20.

The runner 20 here has a plurality of sections 22, 22', 22", wherein the resin for a region 42, 42', 42" flows substantially out of one of the sections 22, 22',22" of the runner 20 into the fiber material 40. Resin for the center region 42 of the fiber material is provided correspondingly mainly in the center section 22 of the runner 20, resin for the outer regions 42" of the fiber material is provided mainly via the two outer sections 22" of the runner 20, and resin for the regions 42' of the fiber material 40 lying in between is provided mainly via the sections 22' of the runner 20.

Figures 3A, 3B, 3C:
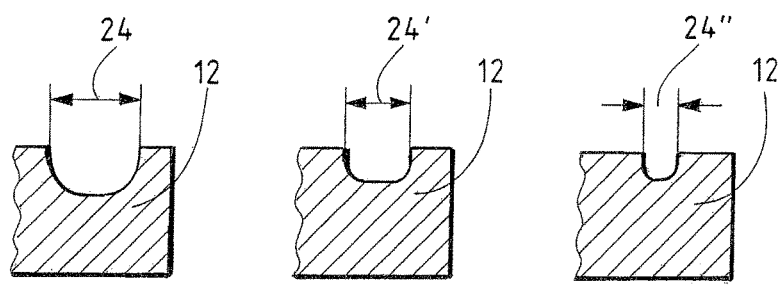
FIG. 3a a schematic sectional representation along the line A-A in FIG. 2.
FIG. 3b a schematic sectional representation along the line B-B in FIG. 2.
FIG. 3c a schematic sectional representation along the line C-C in FIG. 2.

The sections 22, 22', 22" of the runner each have a different channel cross-section 24, 24', 24" as shown in FIGS. 3a, 3b and 3c.

In the center of the runner 20, i.e. in section 22, the channel cross-section 24 is at its largest relative to the channel cross-sections 24', 24" in the other sections 22', 22". Thereby, resin from the center section 22 of the runner 20 arrives unhindered in the center region 42 of the fiber material, however there it flows only relatively slowly due to the greater thickness of the fiber material 40 in comparison to the other regions 42", 42".

The resin in the regions 42' would in contrast flow more quickly because in particular the thickness of the fiber material 40 in the regions 42' is smaller than in region 42. In order to avoid different speeds of the progressing resin flow front in the region 42 and the adjacent regions 42', the runner 20 in the sections 22' has a smaller channel cross-section 24' than the channel cross-section 24 in section 22. Correspondingly, the channel cross-section 24" of the outer sections 22" of the runner 20, via which resin for the region 42" of the fiber material 40 is also provided with smaller thickness, is reduced in comparison to the channel cross-section 24' of the section 22'.

Using the invention achieves that the resin flowing out of the sections 22, 22', 22" of the runner 20 into the regions 42, 42', 42" of the fiber material is quantitatively limited such that in particular independent of the thickness of the fiber material 40 in the different regions 42, 42', 42", a resin flow front is formed that proceeds with uniform flow speed over the entire longitudinal extension of the fiber material 40.

Figures 4A, 4B, 4C:
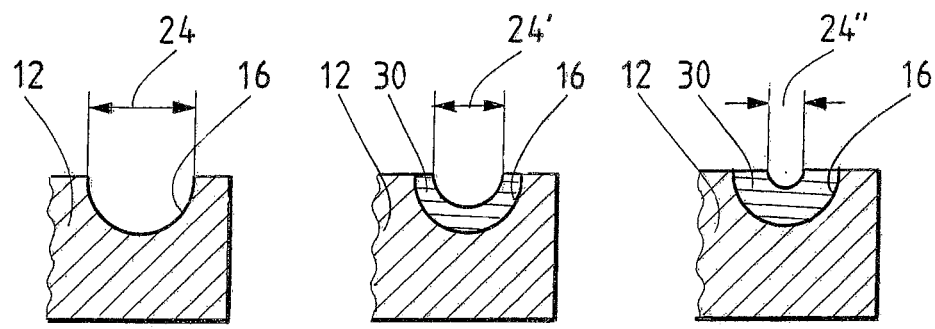
FIG. 4a-c a schematic sectional representation corresponding to the representations in FIG. 3a-c for a further manufacturing mold according to the invention.

FIGS. 4a, 4b and 4c show an alternative design to the runner 20 according to the FIGS. 3a, 3b and 3c with the sections 22, 22', 22" which each have a different channel cross-section 24, 24',24".

Here, it is initially provided that the mold body has a channel 16 that has a substantially constant cross-section along its longitudinal extension. In section 22, shown in FIG. 4a, the runner 20 is formed by a corresponding section of the channel 16 having the channel cross-section 24.

In the sections 22', shown in FIG. 4b, in each case there is an inlay 30 in the channel 16 which is formed on the bottom side, having a shape complementary to the cross-section of the channel 16, and partially closing the channel 16. A channel cross-section 24' for a section 22' of the runner 20 is formed on the top side of the inlay 30.

A corresponding inlay for the runner 20 with the channel cross-section 24" is located in the sections 22".

It is also conceivable that a single inlay 30 is provided in the runner 20 with all necessary sections 22, 22', 22".

The advantage of a runner 20 formed having inlays 30 lying therein, is that the channel cross-sections 24, 24', 24" in the different sections 22, 22', 22" of the runner can be changed quickly, easily and cost-effectively. A flexible modification and optimization with the manufacturing of fiber composite components is thereby possible. The described inlays 30 also allow retrofitting with existing manufacturing molds 10 having a channel 16.

Regardless of the example shown, the invention is not limited to rectangular, planar fiber composite components with significantly stepped thicknesses. Fiber composite components with curved shapes and complex contours can also be readily manufactured with the method according to the invention or using a correspondingly modified manufacturing mold 10 according to the invention.

Figure 5:
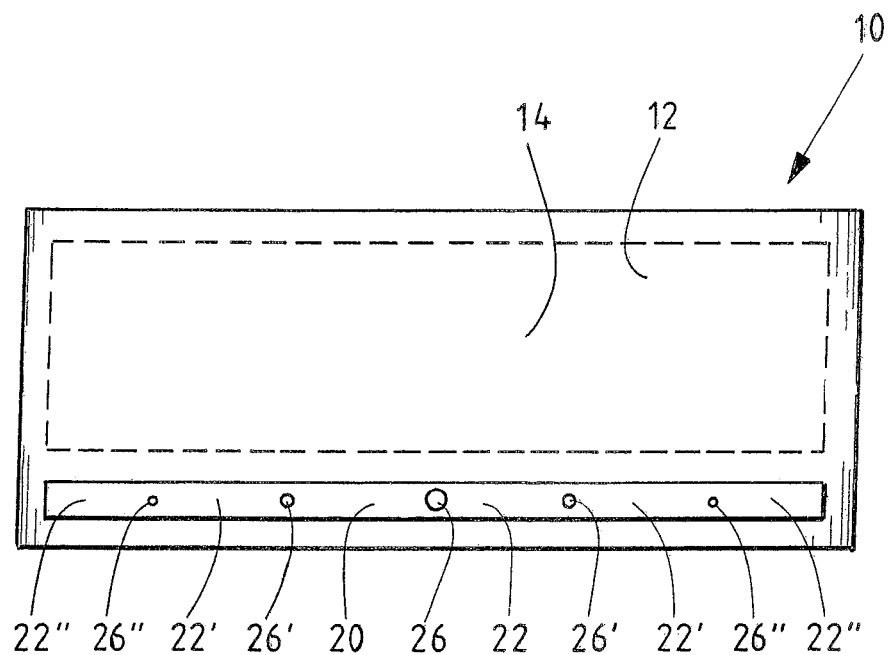
FIG. 5 schematically a further embodiment of a manufacturing mold according to the invention.

FIG. 5 shows a further manufacturing mold 10 according to the invention. This embodiment of the invention also provides a mold body 12 having a mold surface 14 and a runner 20.

The runner 20 has a plurality of resins supplies, or respectively supply connections 26, 26', 26", which each provide a section 22, 22', 22" of the runner 20 with resin from a resin store, not shown. The modification according to the invention of the quantity of resin provided in the individual section 22, 22', 22" of the runner 20 is also possible using suitable measures, such as adapted supply cross-sections or valves.

All named characteristics, including those taken from the drawings alone, and individual characteristics, which are disclosed in combination with other characteristics, are considered individually and in combination as essential to the invention. Embodiments according to the invention can be realized through individual characteristics or a combination of several characteristics. In the scope of the invention, characteristics, which are designated with "in particular" or "preferably" are facultative features.

The following reference numbers are used to denote the corresponding elements appearing in the accompanying drawing figures:

| | |
|---|---|
| 10 | manufacturing mold |
| 12 | mold body |
| 14 | mold surface |
| 16 | channel |
| 20 | Runner |
| 22, 22', 22" | Section |
| 24, 24', 24" | channel cross-section |
| 26, 26', 26" | supply connection |
| 30 | inlay |
| 40 | fiber layers |
| 42 42', 42" | region |

What is claimed is:

1. A manufacturing mold for manufacturing a fiber composite component for a rotor blade of a wind turbine, the manufacturing mold comprising:
    a mold body;
    a channel formed in the mold body;
    an inlay received within the channel formed in the mold body; and
    a runner having a longitudinal extension for supplying flowable matrix material for soaking fiber material introduced into the manufacturing mold such that the flowable matrix material flows from the runner transverse to the longitudinal extension of the runner;
    wherein at least a first section of the runner is defined by the channel formed in the mold body,
    wherein the first section has a first cross-sectional area,
    wherein at least a second section of the runner is defined by the inlay,
    wherein the inlay has a shape complementary to the channel formed in the mold body, and
    wherein the second section has a second cross-sectional area that is different than the first cross-sectional area.

2. The manufacturing mold according to claim 1, wherein the runner has a substantially continuously varying cross-sectional area at least in sections along its longitudinal extension.

3. The manufacturing mold according to claim 1, wherein sections of the runner have a variable cross-sectional area.

4. A method for manufacturing a fiber composite component having a longitudinal extension comprising:
    providing a mold according to claim 1; and
    manufacturing the fiber composite component in the mold such that the fiber composite component along its longitudinal extension has at least a first region having a first thickness and a second region having a second thickness.

5. The method according to claim 4, wherein the longitudinal extension of the fiber composite component manufactured in the mold is arranged substantially parallel to the longitudinal extension of the runner in the mold.

6. The method according to claim 4, wherein the first region of the fiber composite component manufactured in the mold is arranged near the first section of the runner, and wherein the second region of the fiber composite component manufactured in the mold is arranged near the second section of the runner.

7. The method according to claim 5, wherein the first region of the fiber composite component manufactured in the mold is arranged near the first section of the runner, and wherein the second region of the fiber composite component manufactured in the mold is arranged near the second section of the runner.

8. A method for manufacturing a fiber composite component for a rotor blade of a wind turbine comprising:
    introducing a fiber material for the fiber composite component into a manufacturing mold according to claim 1;
    supplying a flowable matrix material for the fiber composite component via a longitudinally extending runner of the manufacturing mold via vacuum infusion such that the fiber material in the manufacturing mold is soaked with matrix material from the runner, said matrix material flowing transversely to the longitudinal extension of the runner, wherein a first region of the fiber material is substantially soaked with matrix material from a first section of the runner, and a second region of the fiber material is substantially soaked with matrix material from a second region of the runner; and
    setting a first matrix material flow rate for the first section of the runner depending on a thickness of the fiber material in the first region, and setting a second matrix material flow rate for the second section of the runner depending on a thickness of the fiber material in the second region.

9. The method according to claim 1, wherein a smaller matrix material flow rate is set with a smaller thickness of the fiber material, and a greater matrix material flow rate is set with a larger thickness of the fiber material.

10. The method according to claim 1, wherein the first matrix material flow rate through a first cross-sectional area is set at or in the first section of the runner, and/or wherein the second matrix material flow rate through a second cross-sectional area is set at or in the second section of the runner.

11. The method according to claim 9, wherein the first matrix material flow rate through a first cross-sectional area is set at or in the first section of the runner, and/or wherein the second matrix material flow rate through a second cross-sectional area is set at or in the second section of the runner.

* * * * *